United States Patent [19]

Buswell

[11] 4,283,823
[45] Aug. 18, 1981

[54] METHOD OF MAKING AN ACTUATING MEMBER FOR A THERMOSTATICALLY CONTROLLED VALVE

[75] Inventor: Robert E. Buswell, Reading, England

[73] Assignee: Western Thomson Controls, Limited, Reading, England

[21] Appl. No.: 75,119

[22] Filed: Sep. 13, 1979

[30] Foreign Application Priority Data

Sep. 22, 1978 [GB] United Kingdom ............... 37741/78

[51] Int. Cl.³ ..................... B23P 13/00; F01P 7/16; B23P 15/00
[52] U.S. Cl. ................................. 29/157.1 R; 29/405; 29/173; 236/34.5
[58] Field of Search ................... 236/34.5, 34; 29/157.1 R, 157 R, 404, 405, 407, 173

[56] References Cited

U.S. PATENT DOCUMENTS

| 716,680 | 12/1902 | Daniels et al. | 29/173 |
| 1,779,131 | 10/1930 | Holness | 29/173 |
| 2,145,989 | 2/1939 | Merten | 29/173 |
| 2,268,723 | 1/1942 | Scherer | 29/157.1 R |
| 2,948,954 | 8/1960 | Ramsa | 29/173 |
| 3,645,443 | 2/1972 | Willson et al. | 236/34 |

Primary Examiner—Daniel C. Crane
Attorney, Agent, or Firm—Miller & Prestia

[57] ABSTRACT

A thermostatically controlled valve, of the type used in a cooling system of an internal combustion engine, has a temperature-responsive actuating member, for opening and closing the valve, in the form of a metal coil having shape memory effect such that its modulus of elasticity increases rapidly at a critical temperature. The actuating member is calibrated prior to assembly in the valve by heating the member to the critical temperature and reducing its length to that at which the valve will begin to open by cutting the member while preventing overheating.

5 Claims, 4 Drawing Figures

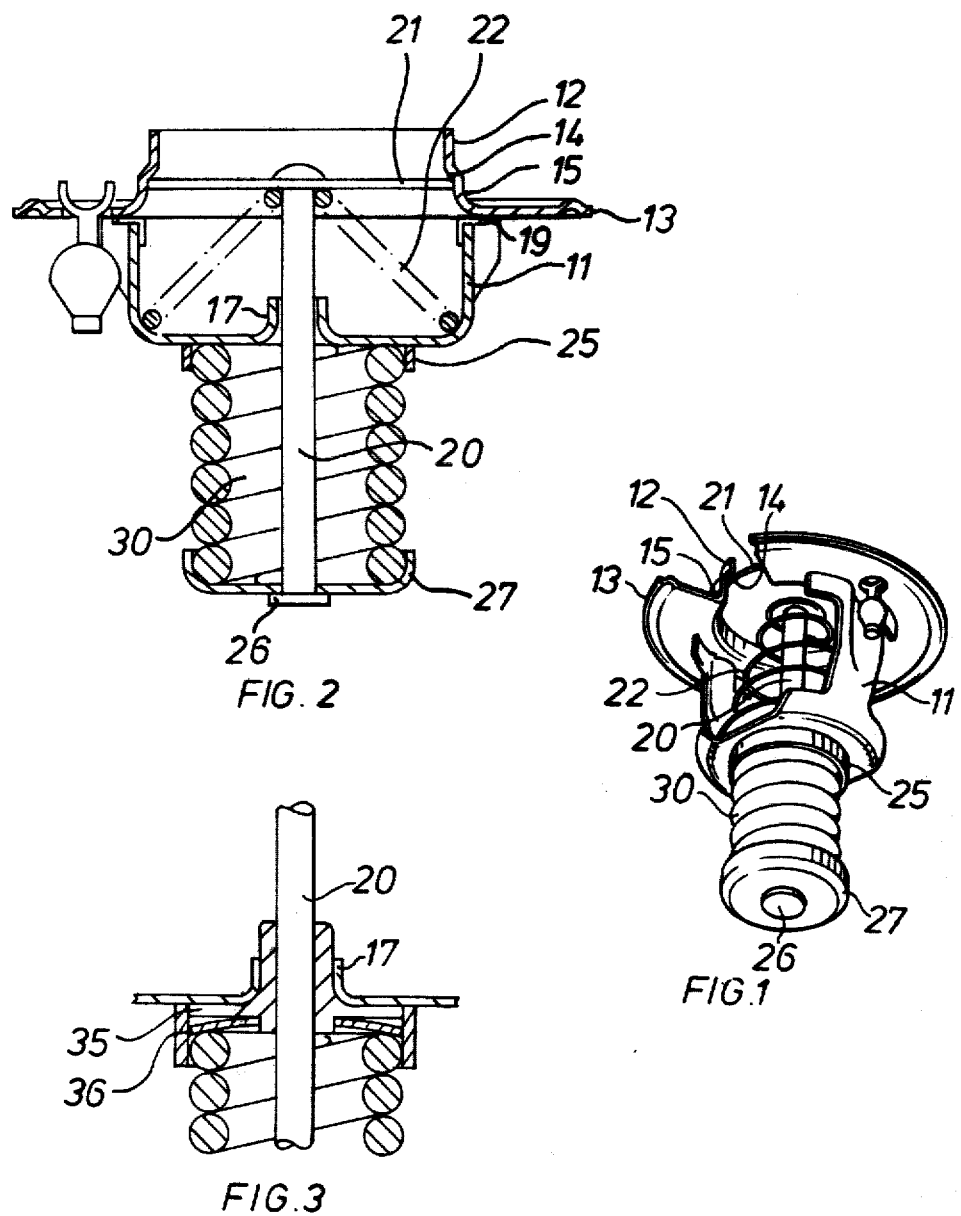

METHOD OF MAKING AN ACTUATING MEMBER FOR A THERMOSTATICALLY CONTROLLED VALVE

This invention relates to a thermostatically controlled valve, for example, for use in maintaining correct running temperature of an internal combustion engine.

For this purpose, it is necessary, for proper temperature control, for the valve to open and close rapidly over a small temperature range. It has been proposed in U.S. Pat. No. 3,645,443 to use an actuating member whose modulus of elasticity varies with temperature in such a manner that there is little expansion up to a critical temperature, but rapid expansion beyond the critical temperature. Such a member is referred to hereafter as having "shape memory effect".

The U.S. patent specification describes a method of heat-treating and pre-stressing the actuating member of a valve, but it has been found that valves made in this manner are not reliable and are not sufficiently accurate for use in relation to internal combustion engines.

The present invention is concerned with providing a more accurate valve.

The present invention provides a method of making a thermostatically controlled valve wherein a closure member is mounted on a body for guided movement, the body being provided with a valve seat, the closure member being movable into and out of engagement with the valve seat, to close and open the valve respectively and being biased to the closed position, and a temperature-responsive actuating member having shape memory effect (as herein-before defined) is mounted to actuate the closure member, characterised in that the actuating member is calibrated prior to its assembly in the valve.

The calibration is preferably carried out by heating the member to a predetermined temperature at which it is required for the valve to start to open, and cutting the member to the correct length for holding the closure member in the start-to-open position whilst preventing overheating of the member during the cutting step.

The invention also resides in a valve made according to the above method and, in particular, relates to such a valve in which the member is in the form of a coil.

Reference is now made to the accompanying drawings wherein:

FIG. 1 is a perspective view of a valve constructed according to the invention;

FIG. 2 is a sectional elevation of the valve of FIG. 1;

FIG. 3 is a detail view of a part of a modified valve; and

Figure 4:
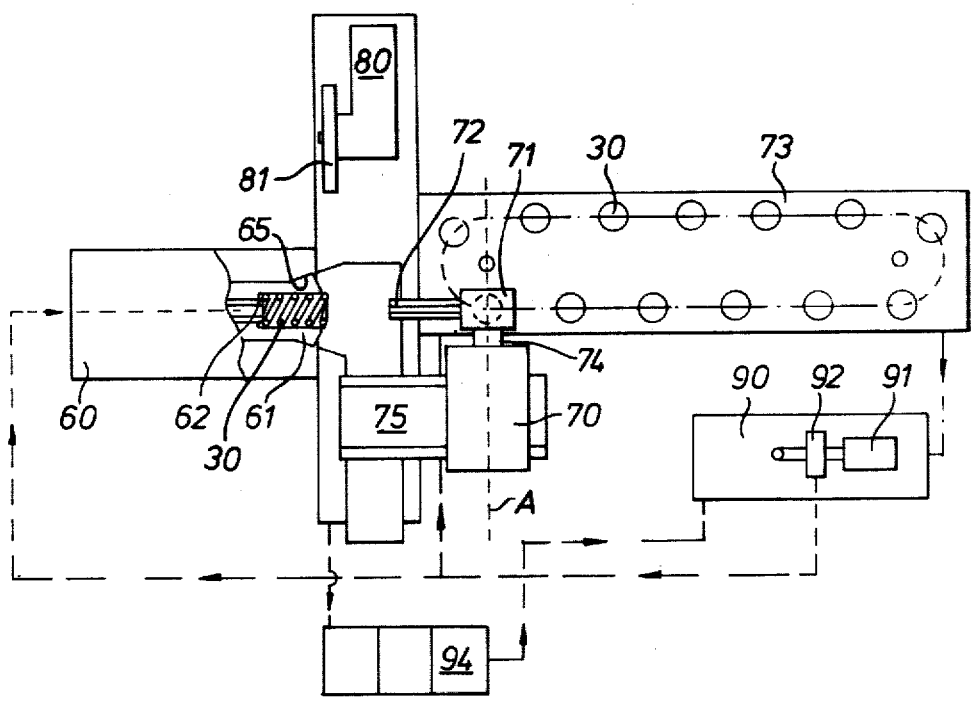
FIG. 4 is a diagrammatic view of calibration apparatus for use in constructing the valve.

Referring to FIGS. 1 and 2 the valve shown comprises a housing including a generally U-shaped first part 11 and an annular second part 12 provided with an outwardly extending circumferential flange 13. The second part 12 is shaped to form an annular shoulder defining a valve seat 14 and an outwardly flared circumferential convex lead-in portion 15 adjacent the seat and between the seat and the flange 13. The first and second parts are joined together by tongues (not shown) formed on the first part 11 and passing through corresponding slots in the circumferential flange 13 in the second part 12, the tongues being peened over.

The bridge portion of the U-shaped first part 11 is centrally formed internally with a hollow boss 17. A valve rod 20 is guided in and extends through the boss 17, the valve rod carrying a closure member 21 of disc form at one end within the housing. A conical coil spring 22 is engaged, about the rod 20 between the closure member 21 and the bottom of the first part 11, so as to urge the closure member 21 to close the valve by engagement with the seat 14.

Externally of the housing, the bottom of the first part 11 is provided with a circular wall 25, coaxial with the boss 17. The end of the rod 20, opposite to the closure member, has a head 26, against which there abuts a shallow dish-shaped locating member 27 for an actuating member 30. The locating member 27 is loosely mounted on the rod 20. The actuating member 30 is in the form of a helical coil and one end is engaged in the locating member 27, the other end fitting within the wall 25. The member 30 is made of SME brass and has shape memory effect. The member is, at normal temperature, fully compressed, as shown, with the spring 22 holding the closure member 21 against the seat 14. As the temperature of the actuating member approaches a critical temperature, there is slight axial extension of the member, but during such extension, the valve remains substantially closed due to the shaping of the lead-in portion 15. Once the critical temperature has been reached, extension is rapid and the valve is fully opened against spring 22 pressure. On cooling the member 30 reverts to its original shape.

In a modification (FIG. 3), in order to prevent mechanical wear, a low-friction bush 35 is inserted between the valve rod 20 and the boss 17. A spring washer 36 is inserted between the bush 35 and the actuating member 30 to take up slack.

An actuating member 30, as originally manufactured, requires calibration due to tolerances necessary in the coiling process and variations in composition of the material used for the member. Each coil is initially wound slightly longer than required, taking into account material variations and manufacturing tolerances.

Referring to FIG. 4, apparatus for effecting calibration comprises a coil holder 60. The holder includes a collet 61 surrounding an annular stop face 62. The coil 30 is insertable in the collet 61 against the stop face 62.

A mechanism 70 is provided for inserting the coils successively in the collet 61. The mechanism has a head 71 provided with jaws 72. The head is rotatable about axis A on shaft 74 to permit the jaws 72 to pick up coils individually from a conveyor 73, and is movable horizontally on carrier 75, to place a picked-up coil in the collet 61.

The holder has a tapered face 65 against which the collet is pulled to clamp the collet about the member 30. A cutter 80 having a rotatable blade 81 is transversable past the collet 65 to cut off the member 30 to a desired length.

The length is determined by presetting of the cutter relative to the stop 62 and the desired length is determined according to the size of the valve. The length is predetermined in the start-to-open position of the valve, and the cutting operation is, therefore, carried out at the critical temperature.

The member is held at the critical temperature by circulation of a heating medium, preferably liquid. Liquid is heated in a reservoir 90 and circulated by a pump 92 driven by a motor 91. The pump 92 pumps the heated liquid through the stop face 62, to heat the member 30 in the collet and back to the reservoir 90 through a separator unit 94, which separates solid particles cut off by the cutter 80. The member 30 is, therefore, held substantially at the critical temperature during cutting, the liquid acting as a heating medium, but also as a cooling medium to prevent overheating during the cutting operation.

I claim:

1. In a method of making a thermostatically controlled valve having a body provided with a valve seat, a closure member mounted for guided movement relative to the body into and out of engagement with the valve seat to open and close the valve, means biasing the closure member to the closed portion, and a temperature-responsive actuating member operatively connected to the body and the closure member for actuating the closure member, the actuating member having a shape memory effect whereby its modulus of elasticity varies with temperature such that it expands little at temperatures up to a critical temperature but expands rapidly at temperatures above the critical temperature, the critical temperature being that temperature at which the valve begins to open by rapid expansion of the actuating member, the improvement comprising the steps of:
   (a) forming the actuating member with a length greater at said critical temperature than a predetermined length required to hold the closure member in the start-to-open position of the valve,
   (b) heating the actuating member to its critical temperature, and
   (c) removing excess material from the actuating member while it is at its critical temperature so as to reduce the length of the actuating member to the said predetermined length.

2. A method according to claim 1, wherein said actuating member is immersed in a fluid at the critical temperature during the step of removing excess material from the actuating member.

3. A method according to claim 1, wherein a liquid medium is heated to the critical temperature and is circulated over the actuating member during the step of removing excess material from the actuating member.

4. A method according to claim 1, and further comprising the steps of:
   (a) mounting the overlength actuating member in holding means having a stop for locating the actuating member in a predetermined position, and
   (b) cutting the overlength actuating member to obtain an actuating member of said predetermined length by moving cutting means past the holding means in predetermined spaced relation to said stop.

5. A method according to claim 4, and further comprising the steps of:
   (a) conveying the overlength actuating means to a station adjacent the holding means, and
   (b) transferring the overlength actuating member from said station to the holding means.

* * * * *